United States Patent
Zimmerman et al.

(10) Patent No.: US 11,775,487 B2
(45) Date of Patent: Oct. 3, 2023

(54) AUTOMATIC FLEXIBLE SCHEMA DETECTION AND MIGRATION

(71) Applicant: Western Digital Technologies, Inc., San Jose, CA (US)

(72) Inventors: Israel Zimmerman, Ashdod (IL); Eyal Hakoun, Gesher Haziv (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/181,553

(22) Filed: Feb. 22, 2021

(65) Prior Publication Data

US 2022/0147497 A1 May 12, 2022

Related U.S. Application Data (60) Provisional application No. 63/113,087, filed on Nov. 12, 2020.

(51) Int. Cl.
*G06F 16/21* (2019.01)
*G06F 16/23* (2019.01)

(52) U.S. Cl.
CPC ........ *G06F 16/211* (2019.01); *G06F 16/2379* (2019.01)

(58) Field of Classification Search
CPC ............................ G06F 16/211; G06F 16/2379
USPC ........................................................ 707/804
See application file for complete search history.

(56) References Cited

U.S. PATENT DOCUMENTS

| | | | | |
|---|---|---|---|---|
| 11,327,944 | B1* | 5/2022 | Payonk | G06F 16/2282 |
| 2009/0287670 | A1* | 11/2009 | Hou | G06F 16/835 |
| | | | | 707/999.102 |
| 2013/0191531 | A1* | 7/2013 | Kruglick | H04L 43/55 |
| | | | | 709/224 |
| 2014/0279838 | A1* | 9/2014 | Tsirogiannis | G06F 16/22 |
| | | | | 707/603 |
| 2015/0088924 | A1* | 3/2015 | Abadi | G06F 16/90335 |
| | | | | 707/769 |
| 2015/0193504 | A1* | 7/2015 | Naidu | G06F 16/248 |
| | | | | 707/774 |
| 2015/0193526 | A1* | 7/2015 | Gaur | G06F 16/316 |
| | | | | 707/747 |
| 2015/0356175 | A1* | 12/2015 | Flynn | G06F 16/901 |
| | | | | 707/752 |
| 2016/0117320 | A1* | 4/2016 | Shukla | G06F 16/93 |
| | | | | 707/769 |
| 2016/0321375 | A1* | 11/2016 | Liu | G06F 16/88 |

(Continued)

*Primary Examiner* — Amy Ng
*Assistant Examiner* — Antonio J Caiado
(74) *Attorney, Agent, or Firm* — PATTERSON + SHERIDAN, LLP; Steven H. VerSteeg (57) ABSTRACT

A method and apparatus for automatic schema detection and migration is disclosed. In embodiments, a file including NoSQL data is received and one or more data types are detected in a hierarchical data table description. Within a record of the NoSQL data, which may be stored in a JSON format, a field name and its data type, are stored in a schema describing the data table. As additional records are parsed, the schema is updated to include additional field names and data types, and may include designations such as repeated and optional, for some fields. In embodiments, the schema is a serialized data format, such as Google Protocol Buffers (Protobuf).

20 Claims, 10 Drawing Sheets (56) References Cited

U.S. PATENT DOCUMENTS

| | | | |
|---|---|---|---|
| 2017/0193019 A1* | 7/2017 | Alsubaiee | G06F 16/221 |
| 2017/0220606 A1* | 8/2017 | Wang | G06N 5/04 |
| 2018/0349463 A1* | 12/2018 | Bernhardy | G06F 16/213 |
| 2019/0042605 A1* | 2/2019 | Kozlowski | G06F 16/212 |
| 2019/0155802 A1* | 5/2019 | Miller | G06F 16/2372 |
| 2019/0332695 A1* | 10/2019 | Bensberg | G06F 16/211 |
| 2020/0012649 A1* | 1/2020 | Chauhan | G06F 3/0605 |
| 2020/0104404 A1* | 4/2020 | Li | G06F 9/5055 |
| 2020/0167335 A1* | 5/2020 | Apte | G06F 16/214 |
| 2020/0320091 A1* | 10/2020 | Wu | G06F 16/2228 |
| 2020/0387498 A1* | 12/2020 | Sundelin | G06F 16/23 |

\* cited by examiner

```
800
{
    _id: 1,
    password: "7f1afdbe",
    firstname: "John",
    lastname: "Doe",
    contacts: [
        {
            method: "phone",
            value: "+123456789999",
        }
    ]
},
{
    _id: 2,
    password: "ae9c300e",
    firstname: "Jane",
    lastname: "Doe",
}
```

```xml
<?xml version="1.0" encoding="UTF-8" ?>
<customer_order number="004985" date="2004-06-24">
   <lines>
      <line no="1">
         <item>Disc CD</item>
         <quantity>30</quantity>
         <price>0.95<price>
      </line>
      <line no="2">
         <item>Disc CD-RW</item>
         <quantity>20</quantity>
         <price>2.95<price>
      </line>
   </lines>
   <customer>
      <name>University</name>
      <street>University 1</street>
      <city>Uni Town</city>
      <post_code>12-345</post_code>
   </customer>
   <payment>
      <card_issuer>Master Card</card_issuer>
      <card_number>1234 567890 12345</card_number>
      <expiration_date month>"10" year="2005" />
   </payment>
</customer_order>
```

FIG. 8B

AUTOMATIC FLEXIBLE SCHEMA DETECTION AND MIGRATION

CROSS-REFERENCE TO RELATED APPLICATIONS

This application claims benefit of U.S. provisional patent application Ser. No. 63/113,087, filed Nov. 12, 2020, which is herein incorporated by reference.

BACKGROUND OF THE DISCLOSURE

Field of the Disclosure

Embodiments of the present disclosure generally relate to computational storage, and more particularly, to the creation and modification of schemas for existing databases.

Description of the Related Art

Databases are typically implemented on host systems, comprising dedicated processors, memory, and storage. When carrying out a database operation such as a select, insert, update, or delete, an application provides instructions to the host system that, in turn, call data from storage and perform the requested operation in memory. The result of the operation is provided to the application and/or written to storage as needed.

Developers have not typically sought to implement database operations on data storage devices. These devices are capable of storing large amounts of data and can be scaled with processing power and fast local memories. However, the effort required for architecting a database to operate on a typical data storage device would be extremely resource intensive and require years of developer-hours. On the other hand, architecting a data storage device in a generalized fashion to manage SQL and non-SQL databases would be similarly resource and time intensive to develop.

What is needed are systems and methods to overcome the shortcomings of prior approaches, to manage and perform database operations on SQL and non-SQL databases, in a data storage device.

SUMMARY OF THE DISCLOSURE

The present disclosure generally relates to systems, methods, and apparatuses for automatic schema detection and migration. In embodiments, a file including NoSQL data is received, and one or more data types are detected in a hierarchical data table description. Within a record of the NoSQL data, which may be stored in a JSON format, a field name and its data type, are stored in a schema describing the data table. As additional records are parsed, the schema is updated to include additional field names and data types and may include designations such as repeated and optional, for some fields. In embodiments, the schema is a serialized data format, such as Google Protocol Buffers (Protobuf).

In one embodiment, a data storage device is disclosed, comprising one or more memory modules, and a controller comprising a processor configured to perform a method for data schema detection and migration. In embodiments, the method includes receiving a portion of a file comprising schema-less data, identifying in the schema-less data one of a field name, a field type, a repeated field, and an optional field, creating a schema for the schema-less data comprising a field, and storing the schema and data from the file in the one or more memory modules.

In another embodiment, a controller for a data storage device is disclosed, that includes an I/O to one or more memory devices and a processor configured to execute a method for data schema detection and migration. In embodiments, the method includes receiving a portion of a file comprising a plurality of field-delimited units of document based data, detecting a data type of one of the plurality field-delimited units of document based data, defining a schema for the one of the field-delimited units of document based data, based on the data type, and storing the file and the schema.

In another embodiment, a system for storing data is disclosed, that includes one or more memory means, and an SSD controller means configured to carry out a method for data schema detection and migration. In embodiments, the method includes detecting a field hierarchy in a portion of a file comprising one of structured or semi-structured document based data comprising a field, and data associated with the field, and a data type associated with the data, defining a schema based on the field hierarchy, the field, the data and the data type, and defining a data table based on the schema and the file.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, and embodiments, are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to systems, methods, and apparatuses for automatic schema detection and migration. In embodiments, a file including NoSQL data is received, and one or more data types are detected in a hierarchical data table description. Within a record of the NoSQL data, which may be stored in a JSON format, a field name and its data type, are stored in a schema describing the data table. As additional records are parsed, the schema is updated to include additional field names and data types and may include designations such as repeated and optional, for some fields. In embodiments, the schema is a serialized data format, such as Google Protocol Buffers (Protobuf).

Figure 1:
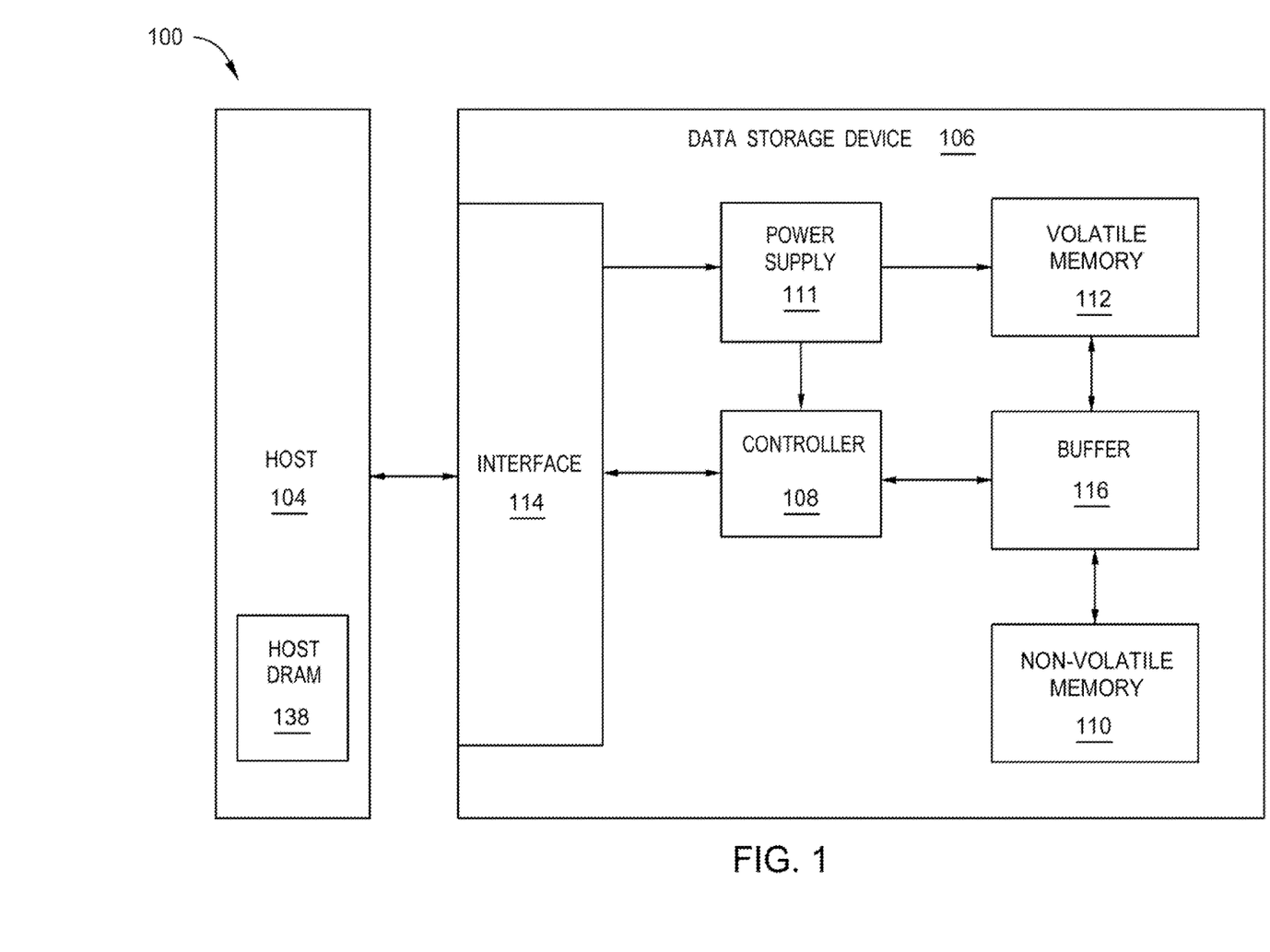
FIG. 1 is a schematic block diagram illustrating a storage system in which a data storage device may function as the data storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104, which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
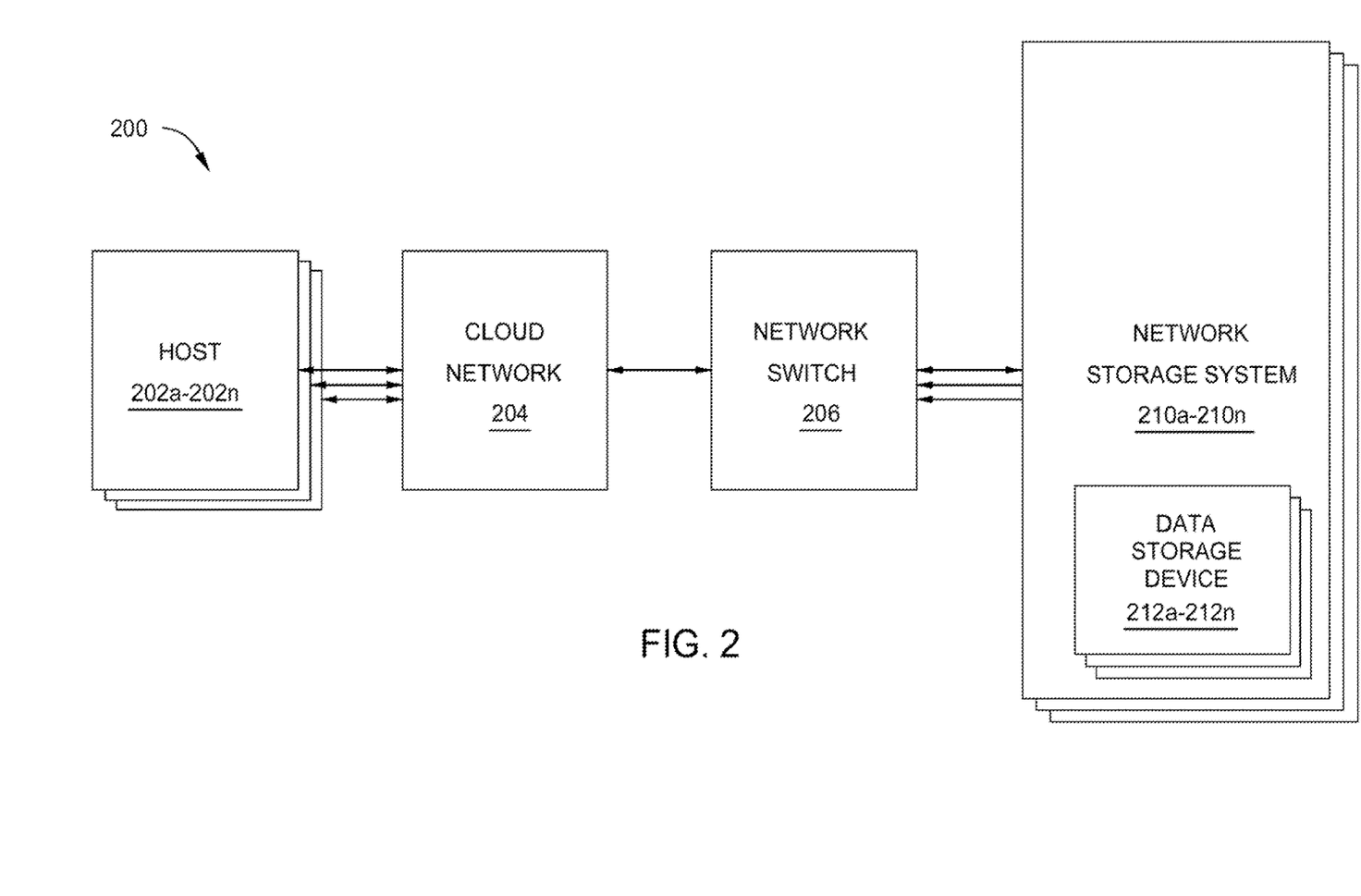
FIG. 2 is a schematic block diagram illustrating a database server system, according to disclosed embodiments.

FIG. 2 is a schematic block diagram illustrating a database server system 200, according to disclosed embodiments. The database server system includes one or more host devices 202a-202n, where each of the one or more host devices 202a-202n may be the host device 104 of FIG. 1, a cloud network 204, a network switch 206, and one or more network storage systems 210a-210n. Each of the network storage systems 210a-210n includes one or more data storage devices 212a-212n, where each of the one or more data storage devices 212a-212n may be the data storage device 106 of FIG. 1 or 304 of FIG. 3, discussed below.

The one or more host devices 202a-202n may be connected to the cloud network 204 via methods of network data transfer, such as Ethernet, Wi-Fi, and the like. The cloud network 204 is connected to the network switch 206 via methods of network data transfer, such as Ethernet, Wi-Fi, and the like. The network switch 206 may parse the incoming and outgoing data to the relevant location. The network switch 206 is coupled to the one or more network storage systems 210a-210n. The data from the one or more host devices 202a-202n are stored in at least one of the one or more data storage devices 212a-212n of the one or more network storage devices 210a-210n.

For example, the one or more network storage systems may be configured to further parse incoming data to the respective one or more data storage devices 212a-212n as well as retrieve data stored at the respective one or more data storage devices 212a-212n to be sent to the one or more host devices 202a-202n. The one or more host devices 202a-202n may be configured to upload and/or download data via the cloud network 204, where the data is uploaded and/or stored to at least one of the one or more data storage devices 212a-212n of the one or more network storage systems 210a-210n. It is to be understood that "n" refers to a maximum number of described components of the database server system 200. For example, the one or more data storage devices 212a-212n may be about 1 data storage device, about 2 data storage devices, or any number greater than about 2 data storage devices.

Figure 3:
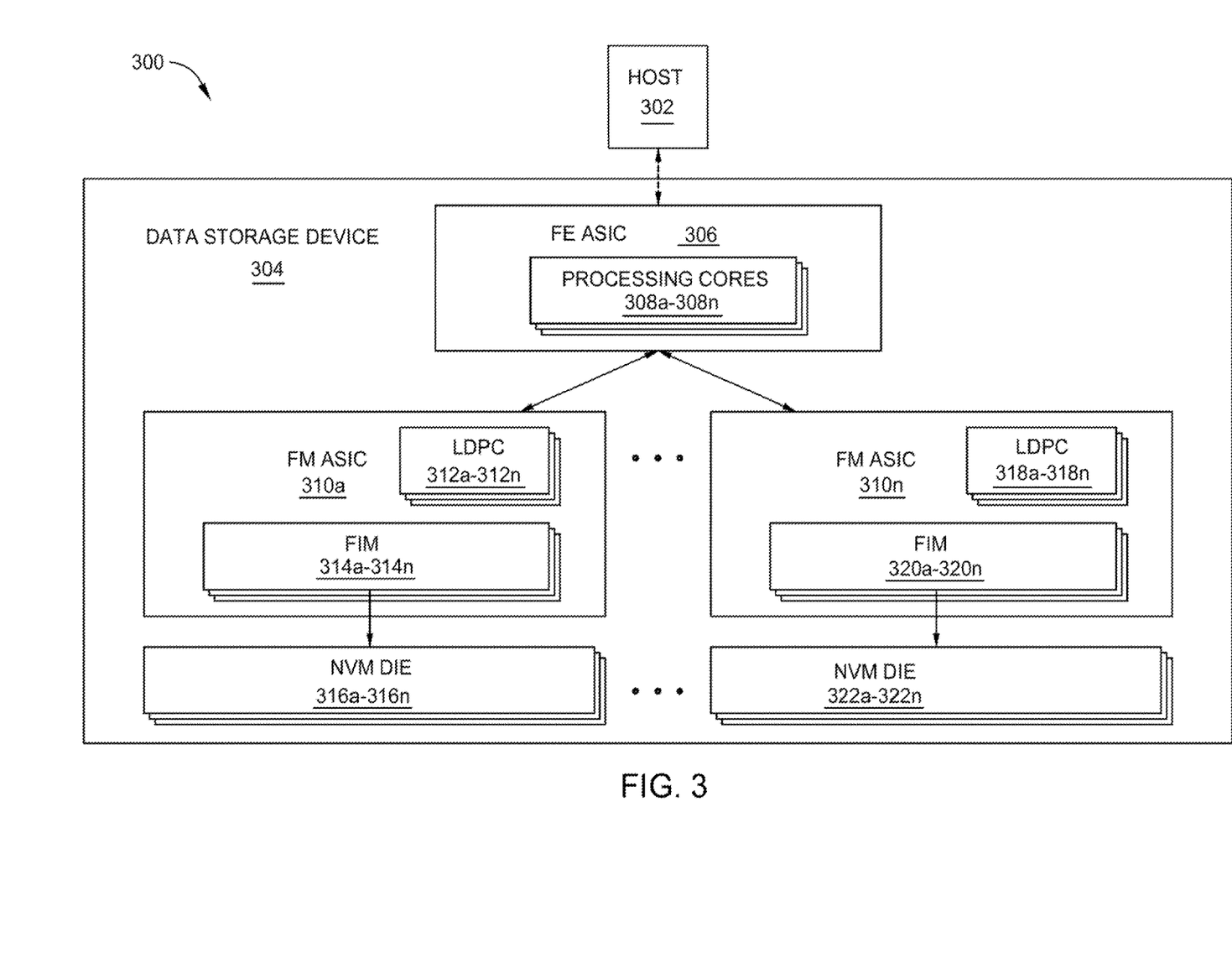
FIG. 3 is a schematic block diagram illustrating an improved data storage device, according to disclosed embodiments.

FIG. 3 is a schematic block diagram of a storage system 300 illustrating an improved data storage device 304, according to disclosed embodiments. The storage system 300 may be the database server system 200 of FIG. 1. For example, the data storage device 304 may be implemented as one or more data storage devices 212a-212n of the one or more network storage systems 210a-210n, and the host device 302 may be implemented as the one or more host devices 202a-202n of FIG. 2. It is to be understood that the data storage device 304 may include additional components not shown in FIG. 3 for the sake of clarity. In one embodiment, the data storage device 304 may be an E1.L enterprise and data SSD form factor (EDSFF).

The data storage device 304 includes a front-end (FE) application-specific integrated circuit (ASIC) 306, a first front-end module (FM) ASIC 310a, and an nth FM ASIC 310n. In the embodiments described herein, the "n" refers to a maximum number of described components of the data storage system 304. For example, the data storage device 304 may include about 10 FM ASICs, where the nth or "n" number of FM ASICs is equal to about 10. The data storage device 304 further includes one or more NVM dies 316a-316n, 322a-322n. Furthermore, the data storage device 304 may include a plurality of FM ASICs (indicated by the ellipses), where each of the FM ASICs of the plurality of FM ASICs are coupled to a respective NVM die of the plurality of NVM dies 316a-316n, 322a-322n. It is to be understood that while a plurality of FM ASICs and a plurality of NVM dies coupled to each of the FM ASICs of the plurality of FM ASICs are described, the data storage device 304 may include a single FM ASIC coupled to a single NVM die or a single FM ASIC coupled to a plurality of NVM dies. In one embodiment, the NVM is NAND memory, where each of the plurality of NVM dies are NAND dies. In one embodiment, the plurality of NVM dies 316a-316n, 322a-322n of the data storage device 304 are bit cost scalable (BiCS) 6 NVM dies. The BiCS 6 NVM dies may have improved operating speeds and lower power consumption than previous versions such as BiCS 5 NVM dies.

The plurality of FM ASICs 310a-310n each comprise a plurality of low-density parity-check (LDPC) engines 312a-312n, 318a-318n and a plurality of flash interface modules (FIMs) 314a-314n, 320a-320n. Each of the plurality of FIMs 314a-314n, 320a-320n are coupled to a respective NVM die of the plurality of NVM dies 316a-316n, 322a-322n. In one embodiment, each FIM is coupled to a respective NVM die. In another embodiment, each FIM is coupled to a respective about four NVM dies. The plurality of LDPC engines 312a-312n, 318a-318n, may be configured to generate LDPC codes or parity data. The LDPC codes and the parity data may be attached to the respective incoming data to be written to the respective NVM die of the plurality of NVM dies 316a-316n, 322a-322n. In one embodiment, the FM ASIC includes about 14 LDPC engines. In another embodiment, the FM ASIC includes less than about 54 LDPC engines.

The LDPC codes and the parity data may be utilized to find and fix erroneous bits from the read and write process to the plurality of NVM dies 316a-316n, 322a-322n. In one embodiment, a high failed bit count (FBC) corresponds to an error correction code (ECC) or parity data size of about 10.0%. For example, in solid state drives (SSDs), about 10.0% of data programmed to the NVM, such as the NVM 110 of FIG. 1, may be ECC or parity data. In another embodiment, a low FBC corresponds to the ECC or parity data size of about 33.3%. When the ECC or parity data size is increased from about 10.0% to about 33.3%, the FBC decreases as the data includes more capability to find and fix failed or erroneous bits. In another embodiment, each NVM die of the plurality of NVM dies 316a-316n, 322a-322n includes between about 10.0% and about 33.3% of ECC or parity data associated with the respective stored data. Furthermore, each NVM die of the plurality of NVM dies 316a-316n, 322a-322n may have a bit error rate (BER) of about 0.2 or less than about 0.2. By including more ECC or parity data with the respective data stored in the NVM dies 316a-316n, 322a-322n, the BER may be decreased or improved, such that the BER has a value closer to about 0. The table below describes a power consumption and read performance improvement by increasing the amount of ECC or parity data to be stored on each NVM die of the plurality of NVM dies 316a-316n, 322a-322n.

TABLE 1

| | FBC High (ECC size ~=10.0%) | FBC Low (ECC size ~=33.3%) |
|---|---|---|
| Read Performance (GB/s) | 1.2 | 4.7 |
| Power Consumption (Watt) | 0.200 | 0.120 |
| NVM Die Per FM | 27 | 7 |
| Total Data Storage Device Capacity (TB) | 5.56 | 4.69 |
| Total Power Consumption (W) | 29.348 | 24.832 |

The listed values in Table 1 are not intended to be limiting, but to provide an example of a possible embodiment. Though the total data storage device capacity is lower when the ECC or parity data size is about 33.3% (i.e., FBC low) than when the ECC or parity data size is about 10.0% (i.e., FBC high), the read performance is increased from about 1.2 GB/s to about 4.8 GB/s, and the power consumption decreases from about 0.200 Watt (using about 10.0% parity size, or high BER engine) to about 0.120 Watt (using about 33.3% parity size, or low BER engine). Thus, the data storage device 304 may have improved power consumption and read performance when the ECC or parity data size is greater.

The FE ASIC 306 includes a plurality reduced instruction set computer (RISC) processing cores 308a-308n. In the description herein, the RISC processing cores 308a-308n may be referred to as processing cores 308a-308n, for exemplary purposes. Although RISC processing cores are described, in embodiments other types of processing cores may be utilized, such as CISC, or other processor architecture. For example, the FE ASIC 306 may include a number of processing cores greater than about 5 processing cores. In another embodiment, the number of processing cores is about 256 processing cores and about 512 processing cores. Each of the plurality of processing cores 308a-308n are configured to receive and execute a database instruction from the host 302. The database instruction may include one of a select, an update, and an insert instruction. The database instruction may further include a delete instruction in addition to the previously mentioned instructions. Furthermore, when receiving a database instruction from the host 302, the FE ASIC 306 may allocate an appropriate number of processing cores of the plurality of processing cores 308a-308n to complete the requested database instructions.

Figure 4:
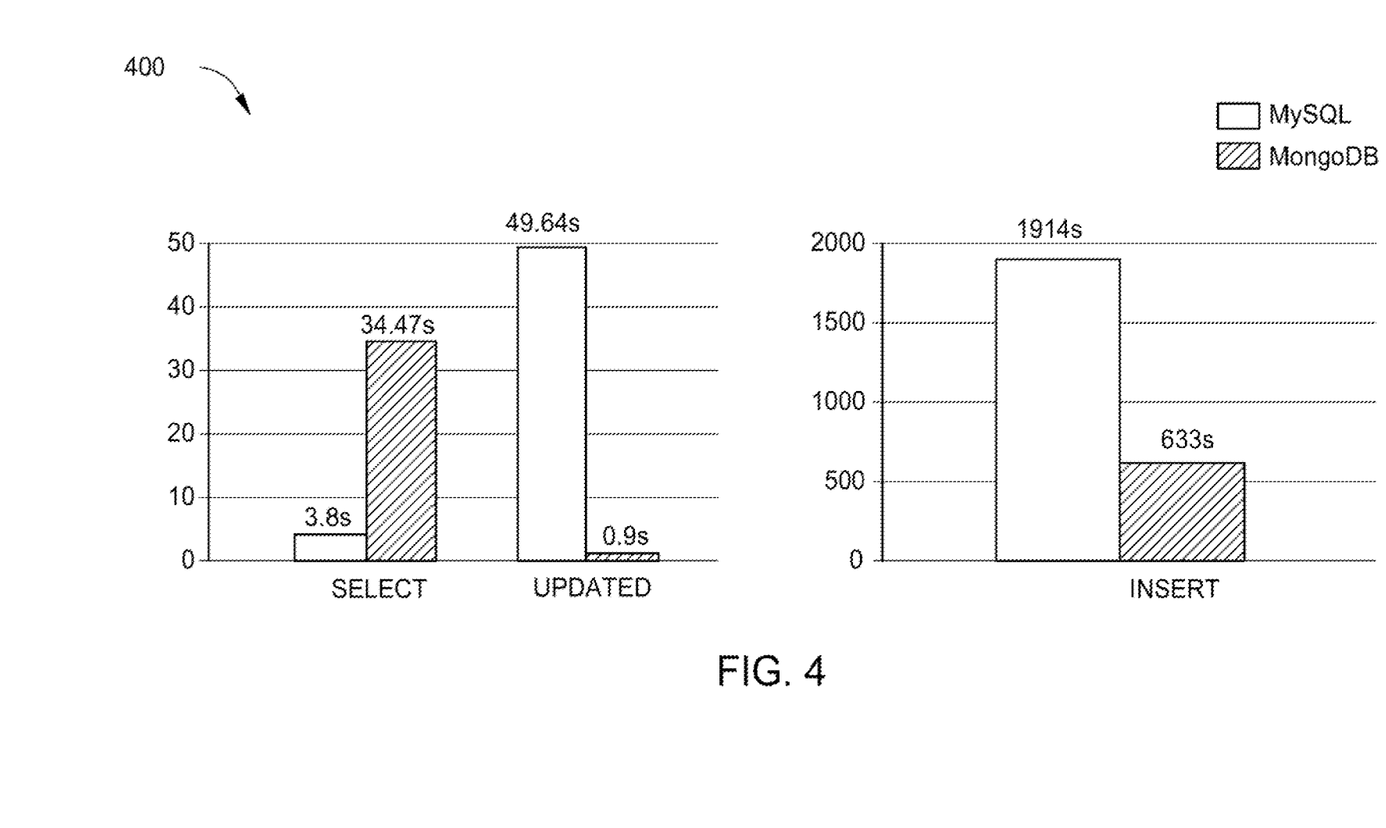
FIG. 4 illustrates the select, update, and insert timing of various databases, according to disclosed embodiments.

FIG. 4 illustrates the select, update, and insert timing of various databases, according to disclosed embodiments. The two databases shown in FIG. 4 are a schema-full data base, such as MySQL, and a schema-less database, such as MongoDB. The differences between a schema-full database and a schema-less database is discussed below in the description of FIGS. 5A-5D. The select command is used to retrieve one or more values (i.e., data), such as a row or a cell, from one or more tables of a database. The update command is used to update one or more values, such as a row or a cell, from one or more tables of the database, where the update command updates the relevant data retrieved from the select command. The insert command is used to insert one or more values, such as a row or a cell, to one or more tables of the database. It is to be understood that while select, update, and insert commands are exemplified, other database commands, such as a delete command, are relevant and relatable to the disclosed embodiments.

In the select timing, the MySQL database has about a 3.8 second completion time, and the MongoDB database has about a 34.47 second completion time. In the update timing, the MySQL database has about a 49.64 second completion time, and the MongoDB database has about a 0.9 second completion time. In the insert timing, the MySQL database has about a 1,914 second completion time, and the MongoDB database has about a 633 second completion time. The listed times are not intended to be limiting but to provide examples of possible embodiments. Generally, the MongoDB database has a faster completion time than the MySQL database. Furthermore, when queries are coupled together, such as a select query and an update query, the MongoDB database has a faster completion time than that of the MySQL database. The MongoDB database may be more appropriate for large unstructured datasets, whereas the MySQL database may be more appropriate for smaller datasets as the MySQL database may be unable to cope with large and unstructured amounts of data.

FIGS. 5A-5D are graphs illustrating the performance of various schemas, according to disclosed embodiments. It is to be understood that while the results in the graphs are exemplified, other results may be achieved with different hardware, operating systems, and operating conditions. A schema of a database system, such as the storage system 300 of FIG. 3, is a structure with respect to stored data. For example, one or more NVM dies of the plurality of NVM dies 316a-316n, 322a-322n may be configured with a schema to store data. The schema structure may include at least one of indexes, packages, procedures, functions, queues, triggers, types, sequences, materialized views, synonyms, database links, directories, Java, and XML schemas. When the database (i.e., schema) is modified, such as changing the data type of a column of the database, the schema will need to be updated with the relevant data type in order for the updated data to be stored. Schemas may store JavaScript Object Notation (JSON) documents, which are an open standard file format. For example, the open stand file format may be a data interchange format that uses text to store and transmit data objects consisting of attribute-value pairs and array data types.

Two categories of schemas are schema-full databases and schema-less databases. A schema-full database is a statically typed database where data is stored in specific columns according to the data type. An example of a schema-full database is MySQL. However, a schema-less database is a dynamically typed database, where the data type of the column may be editable or changeable. An example of a schema-less database is MongoDB. The schema-less database structure may allow for more flexibility to store a wider variety of data types, such as a document, than the schema-full database structure. In some embodiments, the schema-less database may be considered a not only SQL (NoSQL) database, where NoSQL refers to a database that stores document, key-value, wide-column, and graph. The data being stored in the schema database may be stored as text, such as in a Google Protocol Buffer (referred to as a Protobuf, herein) schema format. A Protobuf is a method of serializing structured data. The method involves an interface description language that describes the structure of some data and a program that generates a text form the description of the structure that represents the structure data.

Figure 5A:
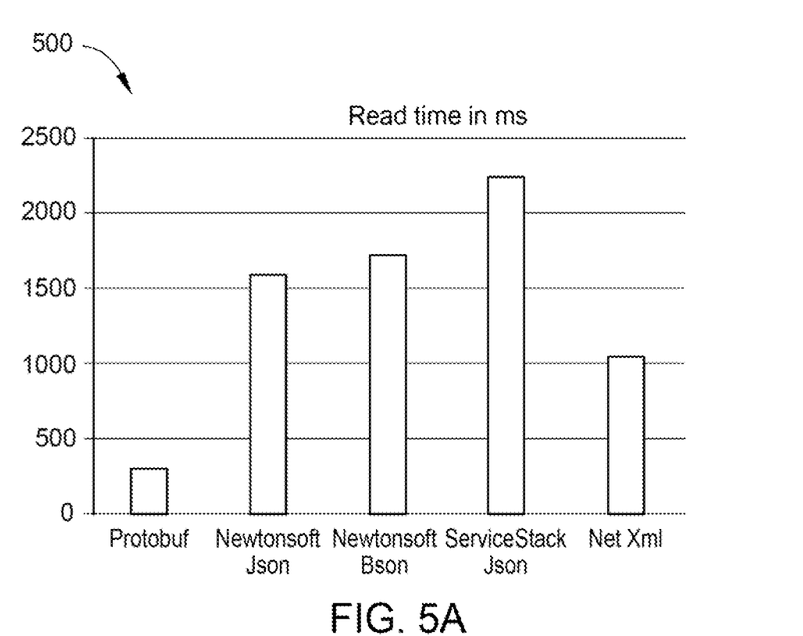
FIGS. 5A-5D are graphs illustrating the performance of various schemas, according to disclosed embodiments.

FIG. 5A is a graph 500 illustrating the read time for data by the various schema databases, such as Protobuf, Newtonsoft Json, Newtonsoft Bson, ServiceStack Json, and .Net Xml. The Protobuf read time is significantly faster than the read times of Newtonsoft Json, Newtonsoft Bson, ServiceStack Json, and .Net Xml. For example, the Protobuf has a read time of about 300 ms and the .Net Xml has a read time of about 1050 ms. The read time of the Protobuf, compared to the next fastest read time of 1050 ms, is about 3.5 times faster.

Figure 5B:
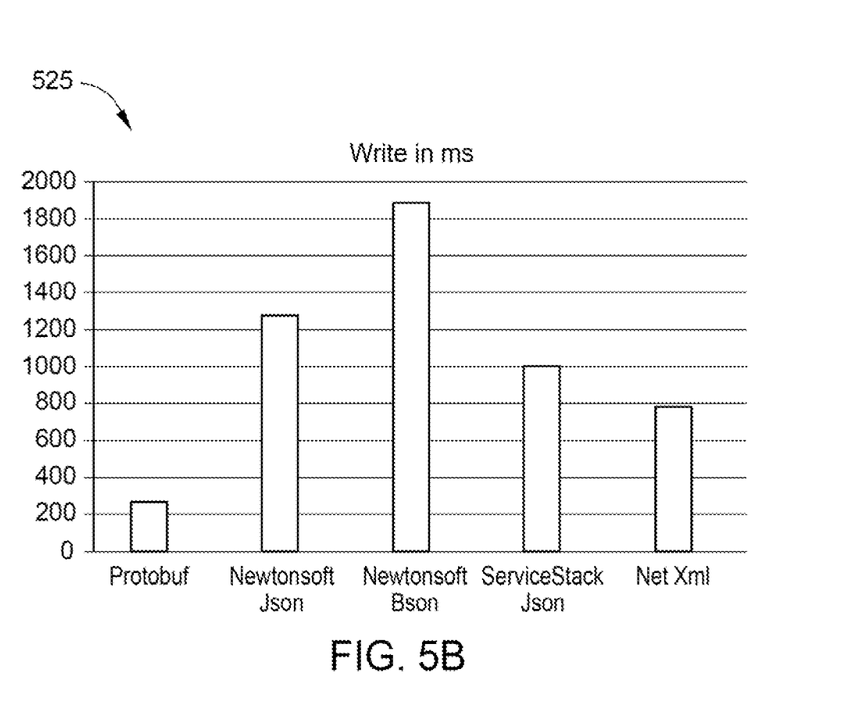

FIG. 5B is a graph 525 illustrating the write time for data by the various schema databases, such as Protobuf, Newtonsoft Json, Newtonsoft Bson, ServiceStack Json, and .Net Xml. For example, the Protobuf has a write time of about 250 ms and the .Net Xml has a read time of about 790 ms. The read time of the Protobuf, compared to the next fastest read time of 790 ms, is about 3.16 times faster.

Figure 5C:
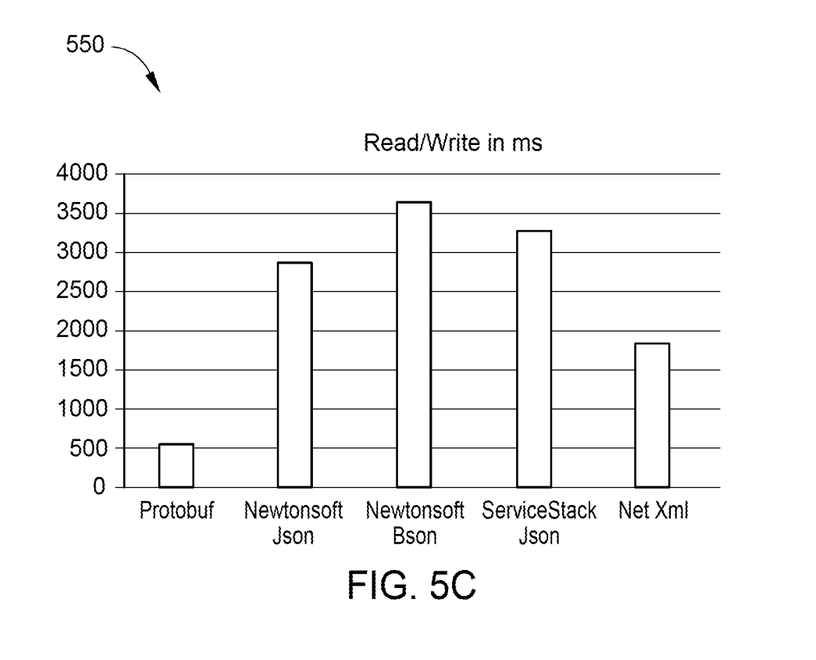

FIG. 5C is a graph 550 illustrating the combined read and write time for data by the various schema databases, such as Protobuf, Newtonsoft Json, Newtonsoft Bson, ServiceStack Json, and .Net Xml. For example, the Protobuf has a combined read and write time of about 550 ms and the .Net Xml has a combined read and write time of about 1840 ms. The combined read and write time of the Protobuf, compared to the next fastest combined read and write time of 1840 ms, is about 3.35 times faster.

Figure 5D:
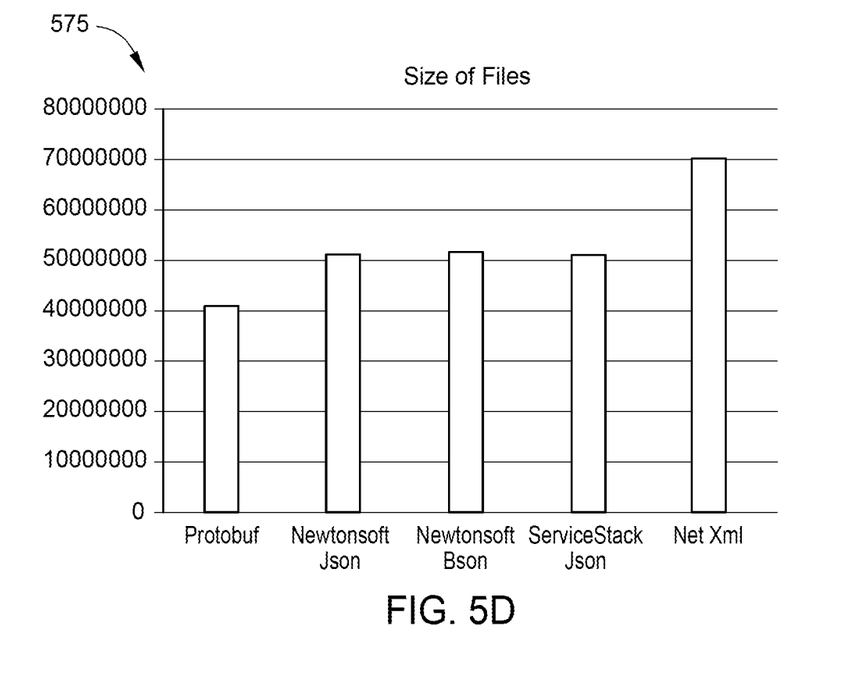

FIG. 5D is a graph 575 illustrating the size of the resulting file by the various schema databases, such as Protobuf, Newtonsoft Json, Newtonsoft Bson, ServiceStack Json, and .Net Xml. For a data write to a schema database, the resulting file size is typically greater than the size of the original file. The resulting file size also includes metadata, parity data, and the like. For example, the Protobuf has a resulting file size of about 40,000,000 B and the Newtonsoft Json, Newtonsoft Bson, and ServiceStack Json each have a resulting file size of about 50,000,000 B. The resulting file size of the Protobuf, compared to the next least resulting file size of 50,000,000 B, is about 20% smaller.

Figure 6:
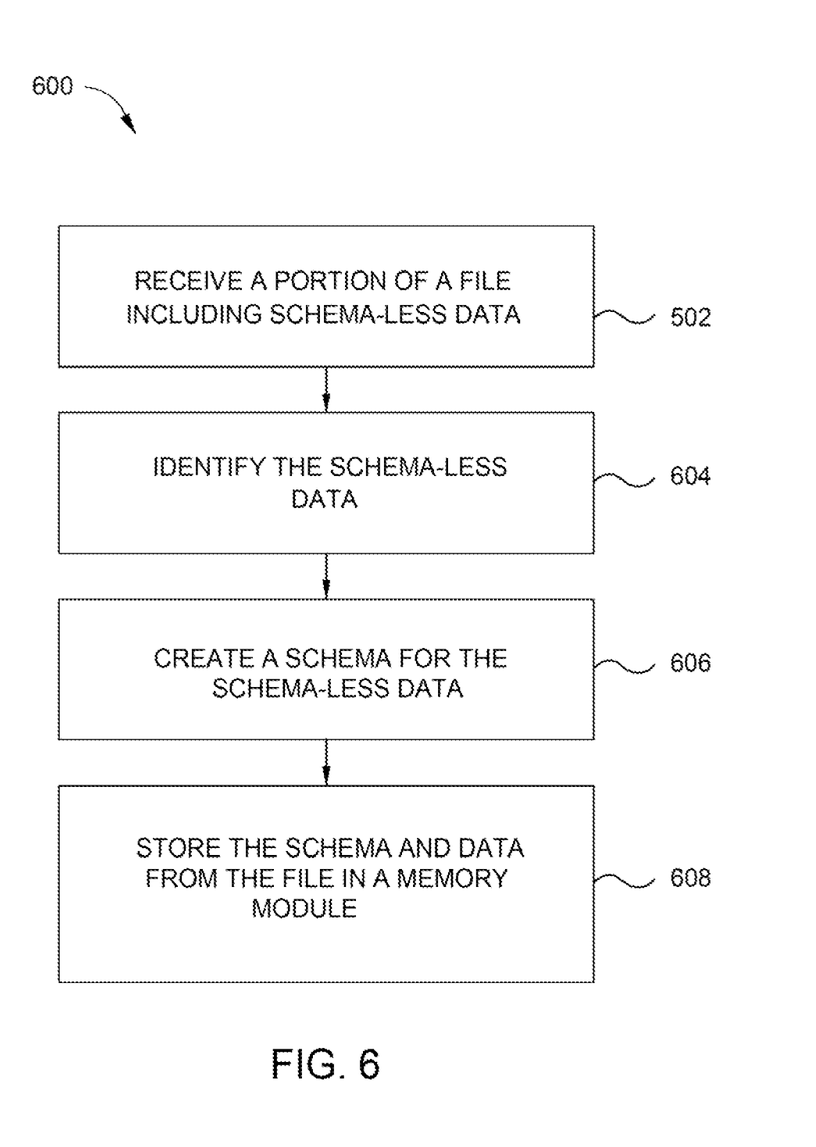
FIG. 6 is a flowchart illustrating a method of creating a schema for schema-less data, according to disclosed embodiments.

FIG. 6 is a flowchart illustrating a method 600 of creating a schema for schema-less data, according to disclosed embodiments. The created schema may be a data serialization structure. At block 602, a controller, such as the controller 108 of FIG. 1, receives a portion of a file including schema-less data. The file may include a plurality of records, where each record includes one or more fields that correspond to one or more data types. In one embodiment, the file may include a plurality of field-delimited units of document based data. For example, MongoDB and other types of schema-less databases are document based databases. The field-delimited units of document based data may include a hierarchy, a repeated field, an optional field, and a combination of the previously listed units.

At block 604, the controller may include a processor or processing cores, such as the processing cores 308a-308n, configured to identify or detect the fields of the received file that includes schema-less data. The fields may include at least one of a field name, a field type, a repeated field, and an optional field. Furthermore, the fields may further include a field size and a mandatory field. Furthermore, the field type may be either a numeric type, a float type, a Boolean type, a string type, an Enum type, or the like. The previously listed fields are not intended to be limiting, but to provide an example of a possible embodiment. In one embodiment, each field may be specific to the data type of the field-delimited units of document based data.

At block 606, the processor or processing cores are configured to create a schema for the schema-less data. The schema may be a statically typed schema with dynamic fields, such that the fields of the statically typed schema may be updated or changed. Furthermore, the schema may be formatted as a Protobuf, due to the performance advantage of the Protobuf schema compared to other schemas as illustrated in FIGS. 4A-4D. The previously listed schema is not intended to be limiting, but to provide an example of a possible embodiment. Each of the plurality of records of the schema-less data are converted to table, according to the created schema.

At block 608, the schema and data from the file are stored in a memory module, such as one or more NVM dies of the plurality of NVM dies 316a-316n, 322a-322n of FIG. 3. Each column of the table may correspond to a field of the schema, such that when storing the schema and the data from the file, both the schema and the table are stored in a memory module.

Figure 7:
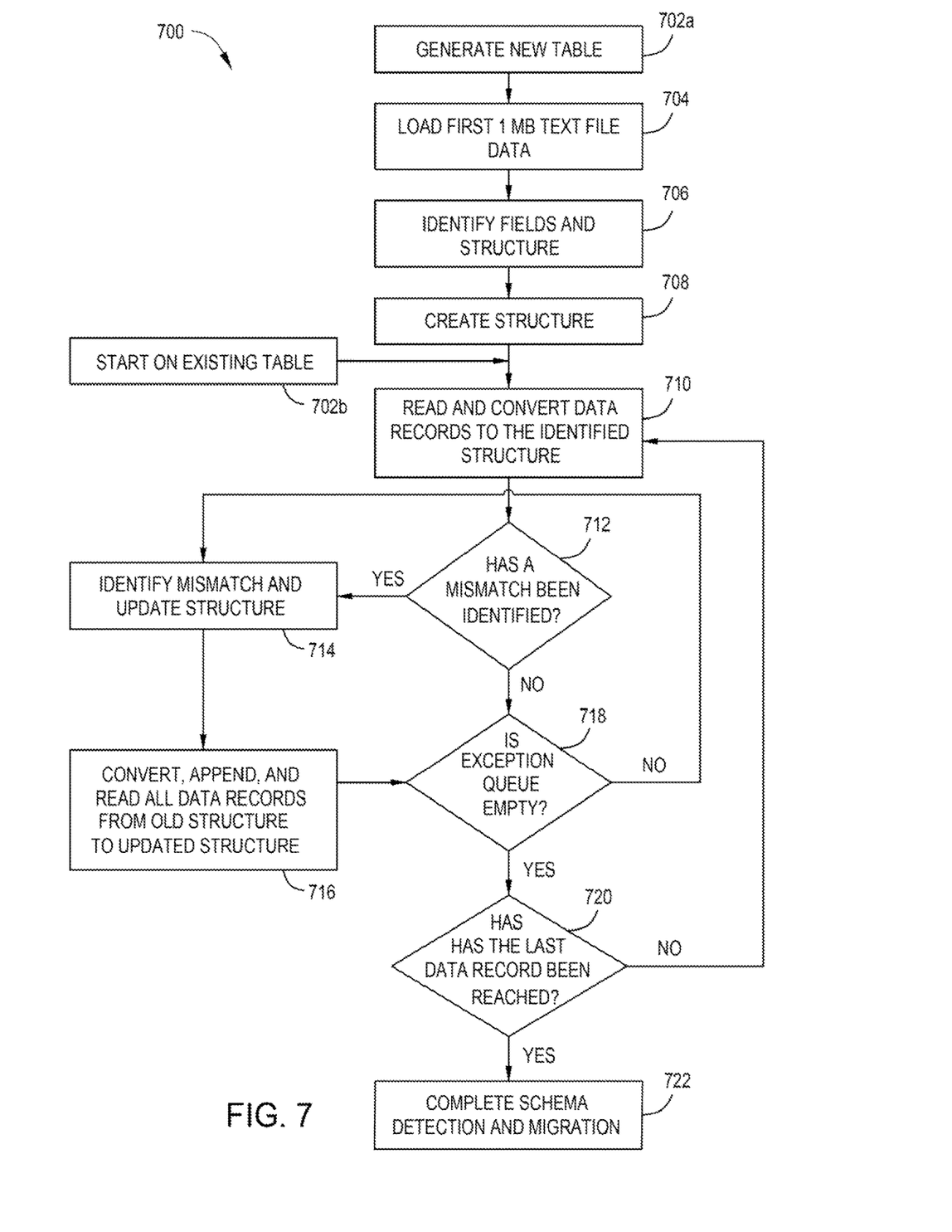
FIG. 7 is a flowchart illustrating a method of an automatic schema detection and migration, according to disclosed embodiments.

FIG. 7 is a flowchart illustrating a method 700 of an automatic schema detection and migration, according to disclosed embodiments. Aspects of method 600 of FIG. 6 may be similar to method 700 described above. At block 702a, the controller, such as the controller 108 of FIG. 1, and/or the processing cores (referred to as processor for exemplary purposes, herein), such as the processing cores 308a-308n, is configured to generate a new table and related schema, where the number of columns and the data type of the columns are not yet identified. The columns of the table may correspond to the fields, such as the field name, the field type, the field size a mandatory field, and additional attributes of the columns may include whether or not a field is an optional field, and/or a repeated field. However, if an existing table is stored at the memory module, such as one or more NVM dies of the plurality of NVM dies 316a-316n, 322a-322n, the method 700 begins at block 702b and continues to block 710 of the method 700.

Figure 8A:
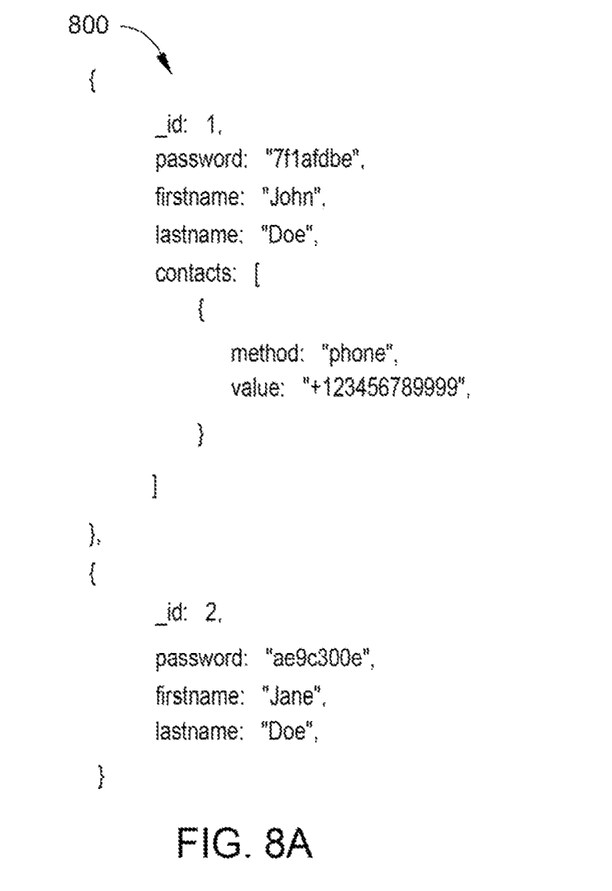
FIGS. 8A-8B are examples of a file, according to disclosed embodiments.
Figure 8B:
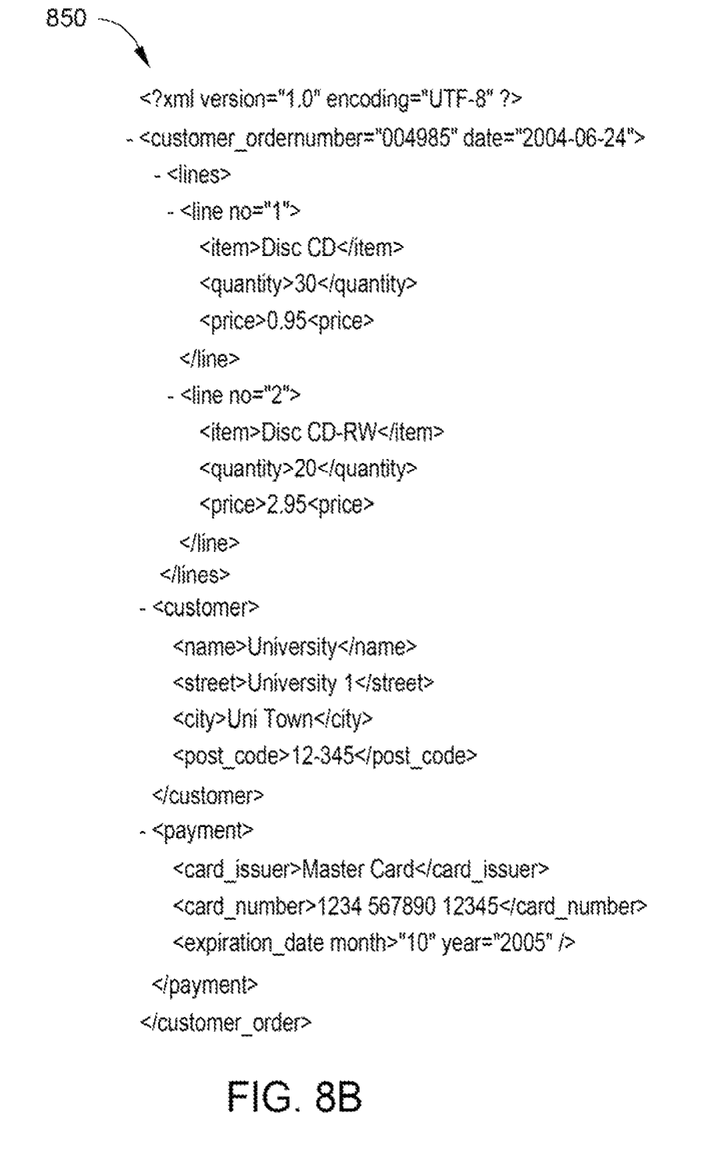

At block 704, the first about 1 MB text file of data is loaded, where the first about 1 MB text file is part of a received data file that is schema-less, or of a dynamically typed schema. Although the first 1 MB of a file is disclosed here for at least initial processing, other portion sizes of a file may be utilized, up to and including an entire file. Moreover, although a text file is disclosed here, one of skill in the art will appreciated that other file formats may be parsed in according to embodiments disclosed herein. In embodiments, the file may be in an XML format, JSON format, or other format used for storage of data by a schema-less, or dynamically typed schema, database such as MongoDB. Examples may be seen in FIG. 8. In some embodiments, unstructured and schema-less data may be used in accordance with this disclosure, with data types, field names, etc., being determined programmatically, such as by a look up table, algorithm, machine learning algorithm (e.g., a classification and/or regression algorithm; via supervised or unsupervised learning methods), or other method capable of parsing data, determining its type and contents so as to develop a schema for that data. The previously listed size is not intended to be limiting, but to provide an example of a possible embodiment.

At block 706, the controller and/or the processing cores are configured to identify the fields and the structure of the text file. In embodiments, when parsing a schema-less or dynamically typed schema based database, such as MongoDB, the parsed fields include a field name, a field type, a determination of whether or not a field is a repeated field, or an optional field, and the schema structures include a structure name, a structure hierarchy, a repeated structure, and an optional structure. Furthermore, the text file may include a plurality of field-delimited units of document based data. At block 708, the controller and/or processor generates a structure of a schema according to the identified fields and the structure of the text field. In one embodiment, the structure of the schema is a Protobuf structure, while other embodiments may utilize a different serialized data schema. Furthermore, the generated schema structure is a data serialization structure.

At block 710, the controller and/or processor is configured to read and convert the data records of the received file to the identified structure of the schema created at block 708. After parsing the first portion of data (e.g., the 1$^{st}$ MB of text file data at block 704), additional data from the file may be consumed and parsed. At block 712, when the controller and/or processor identifies a mismatch between the additional data of the received file and the schema, such as a new field not present in the schema, a change of data type, or a missing field, the controller and/or processor sends the mismatched data to an exception queue of an exception handler. At the exception queue, the controller and/or processor identifies the type of mismatch and updates the structure of the schema to remedy the mismatch at block 714. For example, the controller and/or processor may change or update the field type to match a mismatched data type and produce a new schema structure reflecting the update. Likewise, the controller and/or processor may add a new field to the schema resulting in a new column in the table to allow for a missing field to have a location in the data table and potentially flagging the new field as either required or optional. At block 716, the controller and/or processor converts, appends, and reads all the data records from the old schema structure to the updated schema structure that includes the mismatched data. For example, the previously converted records of the data table are converted to the updated schema.

After completing the process at block 716 or if a mismatch has not been identified, the controller and/or processor determines if the exception queue is empty at block 718. If the exception queue is not empty, then the controller and/or processor continues to identify the mismatch and update the schema structure at block 714. However, if the exception queue is empty at block 718, then the controller and/or processor determines if the last data record of the file has been reached at block 720. If the last data record of the file has not been reached, then the controller and/or processor continues to read and convert data records to the identified schema structure at block 710. The method 700 continues to block 712 and so-forth. When the last data record of the file has been reached at block 720, the schema detection and migration method 700 is completed at block 722. When the method 700 is completed, the controller and/or processor may be configured to execute database operations, such as a query, a record insert, a record update, and a record deletion, on the data table of the schema.

FIG. 8A is an example of a file 800, according to disclosed embodiments. The file 800 may be the any of the files previously mentioned, such as the text file of FIG. 7. The file 800 is a JSON file that includes a first record and a second record. The first record, indicated by a first opening curly bracket in the left-most column and a subsequent first closing curly bracket that is in the same column as the first opening curly bracket, includes the following fields: _id, password, firstname, lastname, and contacts. The "contacts" field further includes an internal structure with an array of values, indicated by the brackets, [ ], that includes the following fields: method and value. The quotations, " ", indicates text values. For example, for the first id, _id=1, the password is stored as a text value of "7f1afdbe". If only the first record exists in a table of the database, then each field of the first record is considered as non-optional or mandatory, indicating that each field is required to contain a value.

However, because the file 800 further includes a second record, indicated by a second opening curly bracket in the left-most column and a subsequent second closing curly bracket that is in the same column as the first opening curly bracket, that includes the following fields: _id, password, firstname, and lastname. Because the second record does not include the "contacts" field, the "contacts" field is converted to an optional field.

FIG. 8B is an example of a file 850, according to disclosed embodiments. The file 850 may be the any of the files previously mentioned, such as the text file of FIG. 7. The file 850 is an XML file that includes a first record. The first record includes a "customer_order number" field, a "date" field, a "lines" field, a "customer" field, and a "payment" field. The "lines" field includes sub-fields such as "line no='1'" and "line no='2'", where each sub-field of the "lines" field includes an "item" field, a "quantity" field, and a "price" field. The "customer" field includes sub-fields such as "name", "street", "city", and "post_code". Likewise, the "payment" field includes subfields such as "card_issuer", "card_number", and "expiration_date month". Each of the fields, sub-fields, and sub-sub-fields have a data type associated with the entries. For example, the "customer_order number" field is identified by an integer number with padded zeros and the "date" field is in the formation "YYYY-MM-DD".

Furthermore, each of the fields may be considered as a enumerated type (enum) data set. Repeated values of the enum data set may be detected for the same field, such as "T/F", "M/F", "work/home/cellular", and the like. The controller and/or processor may be configured to collect up to, but not limited to, about 100 history values for each field, where the controller and/or processor may detect values or fields not present in the enum list of values.

By generating and actively modifying a statically typed schema database for schema-less data, the performance of the data storage device may be improved.

In one embodiment, a data storage device is disclosed, comprising one or more memory modules, and a controller comprising a processor configured to perform a method for data schema detection and migration. In embodiments, the method includes receiving a portion of a file comprising schema-less data, identifying in the schema-less data one of a field name, a field type, a repeated field, and an optional field, creating a schema for the schema-less data comprising a field, and storing the schema and data from the file in the one or more memory modules.

The file includes a plurality of records. The method further includes converting each record of the plurality of records to a table, according to the schema. The storing the schema and data from the file includes storing the schema and the table. The method further includes upon identifying a mismatched field of a record, providing the field mismatch to an exception handler. The mismatched field includes one of a new field, a changed field type, and a missing field. The schema is updated to an updated schema that has been updated based on the mismatched field. The previously converted records of the table are converted to the updated schema. The previously unconverted records of the file are based on the updated schema and added to the table.

In another embodiment, a controller for a data storage device is disclosed, that includes an I/O to one or more memory devices, and a processor configured to execute a method for data schema detection and migration. In embodiments, the method includes receiving a portion of a file comprising a plurality of field-delimited units of document based data, detecting a data type of the one of the plurality field-delimited units of document based data, defining a schema for the one of the field-delimited units of document based data, based on the data type, and storing the file and the schema.

The method further includes defining a data table comprising a plurality of records, based on the file and the schema, executing one of a query, a record insert, a record update, and a record deletion, on the data table, and detecting a field mismatch comprising one of detecting a new field not present in the schema, a change of data type, or a missing field. The method further includes generating a new schema by updating the schema based on the field mismatch. The updating the schema includes one of updating the schema to include the new field, updating the data type of the field, and updating the schema to a field designation of one of required and optional. The method further includes updating the data table based on the new schema. The method further includes converting additional data from the file to the data table, based on the new schema. The controller further includes identifying one of the plurality field-delimited units of document based data as one of hierarchy, repeated, and optional.

In another embodiment, a system for storing data is disclosed, that includes one or more memory means, and an SSD controller means configured to carry out a method for data schema detection and migration. In embodiments, the method includes detecting a field hierarchy in a portion of a file comprising one of structured or semi-structured document based data comprising a field, and data associated with the field, and a data type associated with the data, defining a schema based on the field hierarchy, the field, the data and the data type, and defining a data table based on the schema and the file.

The method further includes identifying a field mismatch in another portion of the file, based on the schema. The method further includes generating a new schema based on modifying the schema based on the field mismatch, and updating the table based on the new schema. The method further includes executing one of a query, a record insert, a record deletion, and a record modification of the data table. The schema is a data serialization structure.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory modules; and
   a controller comprising a processor configured to perform a method for data schema detection and migration, the method comprising:
      receiving a portion of a file comprising schema-less data, wherein the schema-less data comprises a plurality of records;
      identifying one or more fields of a first record of the plurality of records in the schema-less data, wherein each of the one or more fields corresponds to a respective data type of one or more data types;
      creating a schema having one or more columns for the schema-less data based on the identifying, wherein:
         each column of the one or more columns corresponds to a respective field of the one or more fields of the first record of the plurality of records;
         each field of the one or more fields of the first record is a required field;
         each value of each entry in the required field is required;
         each field of the one or more fields is able to be changed to an optional field from the required field; and
         each value of each entry in the optional field is optional;
      storing the schema and the schema-less data from the file in the one or more memory modules; and
      changing a column of the stored schema from being the required field to being the optional field responsive to determining that a corresponding field of one or more fields of a second record of the plurality of records of the schema-less data is absent, wherein the optional field exists in the stored schema.

2. The data storage device of claim 1, wherein the method further comprises converting each record of the plurality of records to a table, according to the schema, and wherein storing the schema and data from the file comprises storing the schema and the table.

3. The data storage device of claim 2, wherein the method further comprises upon identifying a mismatched field of a record, providing the field mismatch to an exception handler.

4. The data storage device of claim 3, wherein the mismatched field comprises one of a new field, a changed field type, and a missing field.

5. The data storage device of claim 3, wherein the schema is updated to an updated schema that has been updated based on the mismatched field.

6. The data storage device of claim 5, wherein previously converted records of the table are converted to the updated schema.

7. The data storage device of claim 5, wherein previously unconverted records of the file are based on the updated schema and added to the table.

8. A controller for a data storage device, comprising:
an input/output (I/O) to one or more memory devices; and
a processor configured to execute a method for data schema detection and migration, the method comprising:
receiving a portion of a file comprising a plurality of field-delimited units of document based data;
detecting a data type of a first field-delimited unit of the plurality of field-delimited units of document based data;
defining a schema for the first field-delimited unit of the plurality of field-delimited units of document based data, based on the data type, wherein:
the schema comprises one or more columns, wherein:
each of the one or more columns corresponds with a respective detected data type;
each of the one or more columns of the first field-delimited unit is a required field;
each value of each entry corresponding to a column having required entries is required;
each column is able to be changed to an optional field from the required field; and
each value of each entry in the optional field is optional;
storing the file and the schema; and
changing a column of the stored schema from being the required field to being the optional field responsive to determining that a corresponding data type of a second field-delimited unit of the plurality of field-delimited unit is absent, wherein the optional field exists in the stored schema.

9. The controller of claim 8, wherein the method further comprises:
defining a data table comprising a plurality of records, based on the file and the schema.

10. The controller of claim 9, wherein the method further comprises executing one of a query, a record insert, a record update, and a record deletion, on the data table.

11. The controller of claim 9, wherein the method further comprises detecting a field mismatch comprising one of detecting a new field not present in the schema, a change of data type, or a missing field.

12. The controller of claim 11, wherein the method further comprises generating a new schema by updating the schema based on the field mismatch, wherein updating the schema comprises one of:
updating the schema to include the new field;
updating the data type of the field; and
updating the schema to a field designation of one of required field and the optional field.

13. The controller of claim 12, wherein the method further comprises updating the data table based on the new schema.

14. The controller of claim 12, wherein the method further comprises converting additional data from the file to the data table, based on the new schema.

15. The controller of claim 8, further comprising identifying one of the plurality field-delimited units of document based data as one of hierarchy, repeated, and optional.

16. A system for storing data, comprising:
one or more memory means; and
a solid state drive (SSD) controller configured to carry out a method for data schema detection and migration, the method comprising:
detecting a field hierarchy in a portion of a file comprising one of structured or semi-structured document based data, wherein the portion of the file comprises a plurality of fields, data associated with each field of the plurality of fields, and a data type associated with the data;
defining a schema based on the field hierarchy, wherein:
the schema comprises one or more columns, wherein:
each column corresponds to a respective field of the plurality of fields;
each field of the plurality of fields of the portion of the file is a required field;
each value of each entry in the required field is required;
each field of the plurality of fields is able to be changed to the optional field from the required field; and
each value of each entry in the optional field is optional;
defining a data table based on the schema and the file; and
changing a column of the schema from being the required field to being the optional field responsive to determining that a corresponding field in a next portion of the file is absent, wherein the optional field exists in the stored schema.

17. The system of claim 16, the method further comprising identifying a field mismatch in another portion of the file, based on the schema.

18. The system of claim 17, wherein the method further comprises generating a new schema based on modifying the schema based on the field mismatch, and updating the table based on the new schema.

19. The system claim 18, the method further comprising executing one of a query, a record insert, a record deletion, and a record modification of the data table.

20. The system of claim 16, wherein the schema is a data serialization structure.

* * * * *